United States Patent Office 3,099,570
Patented July 30, 1963

3,099,570
FILLER FOR PAPER AND METHOD OF
MAKING THE SAME
John G. Leech, Westernport, Md., and Thomas B. Fleischer, Appleton, Wis., assignors to West Virginia Pulp and Paper Company, New York, N.Y., a corporation of Delaware
Filed July 19, 1961, Ser. No. 127,086
26 Claims. (Cl. 106—288)

This invention has to do with filler used in the manufacture of paper to control the brightness and the opacity thereof, and more particularly with filler composed of aluminum silicate or of aluminum silicate precipitated in and on paper making fibers. The invention also has to do with the production of the filler and the incorporation of the filler into paper.

The present application is a continuation-in-part of our copending application Serial No. 813,019, filed May 13, 1959, for Pigment Fiber Filler for Paper and Method of Making Same, now abandoned.

The filler is made, according to the invention, in successive steps as follows:

(1) An aluminum salt of a strong, common, mineral acid is blended with water in sufficient quantity to provide a solution having a pH of less than 4. The water to which the aluminum salt is added may contain no fibers, or it may be a fiber suspension having any consistency in the range from a mere trace up to about 4.2% oven dry fibers;

(2) A solution of sodium silicate is progressively added directly to the aluminum salt solution under high shear agitation to form an aluminum silicate precipitate, the sodium silicate being added at a rate sufficiently restricted in relation to the degree of shear agitation maintained at the point of addition to avoid the formation of a lumpy precipitate;

(3) Either concurrently with the addition of a final part of the sodium silicate or following such addition, sodium hydroxide is added under high shear agitation in quantity sufficient to assure the substantially complete reaction of the sodium silicate in the production of the precipitated aluminum silicate, but sufficiently restricted to avoid raising the pH over 4 throughout the precipitation process;

(4) When the precipitation is complete, adding a sufficient quantity of alkali solution, as sodium hydroxide, calcium hydroxide, or calcium carbonate to raise the pH to the range of 4.3 to 4.8 and then adding the total product to a paper machine furnish in suitable ratio to provide a desired total ash contained in the resulting paper.

If it is a pulp suspension to which the aluminum salt is added, the blending of the salt with the suspension is desirably carried on for a sufficient time to cause the fibers to become thoroughly impregnated with the salt solution. In such a case the aluminum salt may be added either before or after the refining or beating of the pulp.

The intimate incorporation of mineral pigment into paper fibers through the precipitation of the pigment from a pulp suspension has been known since at least as early as the issue of U.S. Patent 123,747 to Tiemann on February 13, 1872. According to the Tiemann process, alum was introduced into the vessel containing the pulp, the alum solution being caused thoroughly to penetrate each fiber. Freshly burned, slaked lime was then added, causing a precipitate of hydrate of alumina and sulphate of lime to be formed not only on the surface but in the very interior of each fiber.

Numerous patents have since been granted, directed to the precipitation within and upon pulp fibers of insoluble salts of the alkaline earth metals, notably calcium.

In Allen, 2,786,776, the object is to produce a finely divided aluminum silicate suitable for use as a reinforcing pigment for rubber compositions. The patentee disparages the idea of producing aluminum silicate by reacting an aluminum salt with sodium silicate, saying that the precipitate thus produced and dried is in the form of a glassy substance, and that even when ground up or crushed the product is made up of agglomerated masses which are too coarse and too hard to permit satisfactory use in a rubber compound. The same point of view is stressed in Taylor, 2,786,757. So convinced was Taylor of the impracticability of directly reacting alum with sodium silicate to produce a paper filler that, in his Patent 2,786,757, he adopted the expedient of first reacting sodium silicate with calcium chloride in order to produce a fine calcium silicate precipitate for reaction with alum. The purpose of this circuitous procedure was to produce aluminum silicate of the desired fineness.

The problem of producing a practical aluminum silicate-fiber filler has, in fact, presented serious difficulties, but we have succeeded through the present invention in providing a filler of this kind which is not only free from the faults pointed out by Allen and Taylor but which possesses very desirable properties of opacity, brightness, over all retention, freedom from flaws, and economy of production and use. The filler of the present invention is a very satisfactory substitute even for titanium dioxide filler from an economic point of view, being substitutable at reduced expense with no loss, or even with an increase of brightness.

The present invention, for the first time, provides a practical and advantageous aluminum silicate-fiber filler by directly reacting solutions of aluminum salts and sodium silicate in the presence of suspended fibers, either alone or together with other materials such as clay, diatomaceous earth and the like.

A practical procedure will be described as a first example, its limitations and permissible variations will be pointed out, and then additional illustrative examples will be given.

In the drawing forming part of this specification.

One object is to provide fibers, preferably hardwood fibers, permeated and coated with a pigment (aluminum silicate) produced from an aluminum salt, for example, mill grade alum, $Al_2(SO_4)_3 \cdot 14H_2O$, or chemically pure alum, $Al_2(SO_4)_3 \cdot 18H_2O$, or chemically pure aluminum nitrate, $Al(NO_3)_3 \cdot 9H_2O$, or technical aluminum chloride $AlCl_3$, and sodium silicate $Na_2(SiO_2)_{3.5}$. The actual chemical operation, when alum is employed, can be most readily and logically understood by considering first the following two suppositious equations, (a) $\quad Al_2(SO_4)_3 + 6NaOH = 2Al(OH)_3 + 3Na_2SO_4$ and (b) $\quad Na_2O(SiO_2)_{3.5} + H_2O = 2NaOH + (SiO_2)_{3.5}$ If Equation b be multiplied through by eight-sevenths, we have:

(c) $\quad 1.14Na_2O(SiO_2)_{3.5} + 1.14H_2O = 2.29NaOH + 4SiO_2$

Combining Equations a and c but providing only 3.71NaOH in place of 6NaOH of Equation a we get:

(d) $\quad Al_2(SO_4)_3 + 3.71NaOH + 1.14Na_2O(SiO_2)_{3.5} + 1.14H_2O = 2(Al(OH)_3 \cdot (SiO_2)_2) + 3Na_2SO_4$ In Equation d the significant term, representing the desired product could be written stoichiometrically as $Al_2O_3 \cdot (SiO_2)_4 \cdot 3H_2O$. However, it is known that in silica-alumnia compounds, the silica and the alumina may be combined in a great variety of ratios. The equation is merely illustrative and is not intended to imply limitation to the combining of silica with alumina in a 4 to 1 molecular ratio. In point of fact, tests have shown that if we write the formula for the product as $$Al_2O_3 \cdot (SiO_2)_x \cdot 3H_2O$$

$x$ may be any number from 3.9 to approximately 5.4+. Compounds involving the combination of silica with alumina in molecular ratios of 6 to 1, to 40 to 1 are known, but we have found that the yield of filler is greater when the ratio of silica to alumina is below 5.5.

Tests of the mineral filler made according to the present invention show that the aluminum silicate produced has an average particle size of the order of 1.1 microns.

EXAMPLE 1

In one of the earlier experimental runs the proportions of silicate, alum and sodium hydroxide to oven dry pulp used were 430%, 569% and 54% respectively. In this run 3700 gallons of a 70% hardwood, 30% pine pulp suspension of 2.4% consistency, previously beaten to a ninety seconds Williams freeness were supplied to a slip tank 10 (FIGURE 1) from a pulp line 12 through valves 14 and 16, the valve 14 being then closed and the valve 16 being left open. Seven hundred eighty gallons of liquid alum (5.4 lbs. alum per gallon) were measured and pumped through a line 18 into the slip tank 10, where it was blended with the pulp by means of a stirrer 19. The percentage of alum in the pulp-alum slurry was 10.1. Five hundred fifty gallons of 37.5% sodium silicate, grade N (containing 8.9% NaOH and 28.7% $SiO_2$), were measured and supplied to a silicate and caustic tank 20, and water was added sufficient to bring the volume up to about 2050 gallons.

Figure 1:
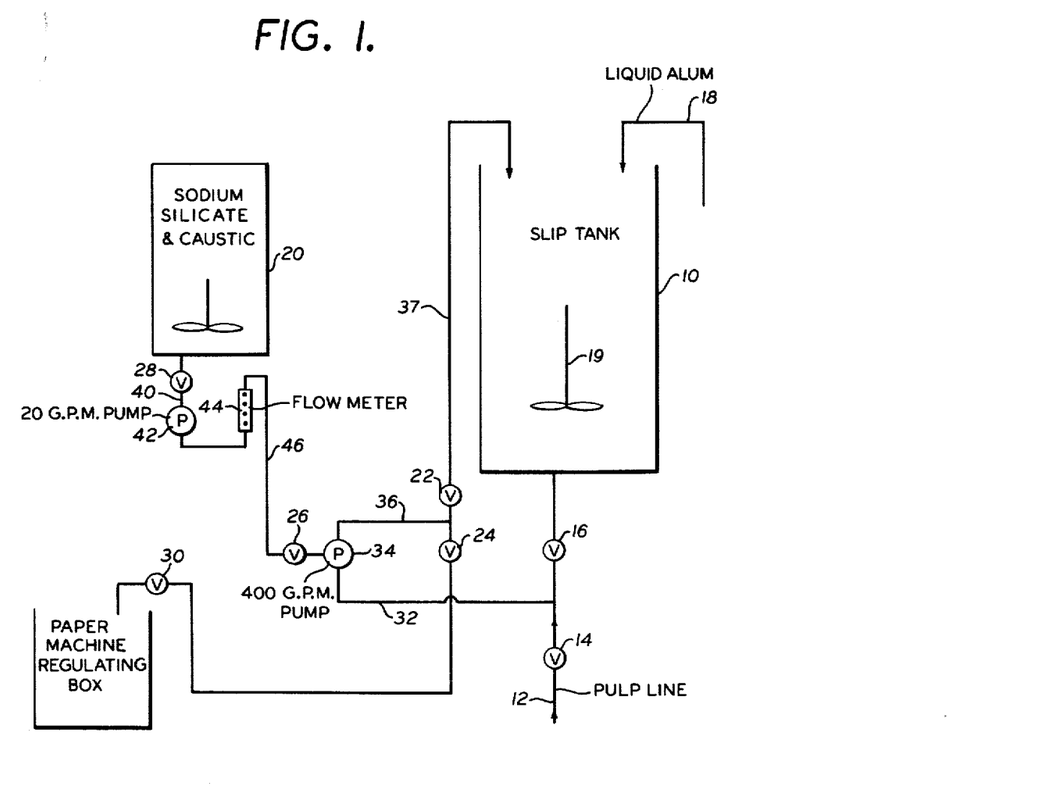
FIGURE 1 is a diagrammatic view of apparatus which may be advantageously employed in the production of the filler by a batch process and the delivery of it to a paper making machine.

The pump 34 was then started to cause the pulp and alum mixture to be circulated from the tank 10 through valve 16, line 32, pump 34, line 36, valve 22 and line 37 back to the tank 10. When the flow through the pump had been checked and found to exceed 200 gallons per minute, the valves 28 and 26 were opened, causing the silicate to be delivered through a line 40, a feed pump 42, a flow meter 44, a line 46 and the regulating valve 26 to the pump 34. The valve 26 was set to maintain a flow meter reading of 12 gallons per minute. When nearly all the silicate in the tank 20 had been delivered, 184 gallons of the silicate solution, 400 pounds of solid sodium hydroxide and 200 gallons of water were measured, mixed and added to the remaining silicate in the tank 20. The additional silicate constituted substantially the last twenty-five percent of sodium silicate added. The silicate solution in this instance was a 20% solution, this strength being chosen because the pulp consistency was 2.4%. The flow meter was kept steady at 10 to 12 gallons per minute.

When all the sodium silicate and sodium hydroxide had been added in the quantities stated, the filler was fed to the paper making machine by opening the valves 24 and 30 and at least partially closing the valve 22. During the delivery of the filler to the regulating box of the paper making machine, the ratio of filler to pulp furnish was adjusted by adjustment of the valve 30.

The product consisted of 6914 gallons of material having a pH of 3.9 and a density of 1.12. The filler suspension included 7.26% solids of which 72.2% on an oven dry basis was ash; i.e., incombustible mineral matter. This filler was used in a number of paper making runs with the following results:

On 40.6 pound tablet white paper, the specifications calling for a G.E. brightness of 77 and a Nelson opacity of 69 could be met by substituting 3.5% of the novel filler for 7.5% Titanox C–50 (a mineral pigment filler consisting of 50% titanium dioxide and 50% calcium carbonate). The paper had a G.E. brightness of 78–79, 1 to 2 points higher than the regular grade which was 77. A material cost reduction of $15.75 per ton of tablet paper produced was realized. The Nelson opacity of the sheet was reduced from 79 to 78.

To maintain the opacity level of Nelson 79 of the regular grade, 6.5% of the novel filler had to be substituted for 7.5% Titanox C–50. This paper had a G.E. brightness of 79–81, two to four points higher than the 77 brightness of the regular grade. In this instance a material cost saving of $7.50 per ton of paper was realized.

The filler manufacturing procedure described in Example 1 admits of considerable variation. The variables involved in the manufacture of the novel filler have been studied carefully and extensively and certain definite conditions and procedures have been found to be optimum or nearly so.

As described, the pump used in making the filler was a pulp which had already been beaten. By using already beaten pulp the need for prolonged beating of the pulp with the full amount of alum is avoided. The pulp can be beaten after addition of the alum if beating to a Williams freeness of 90 seconds can be effected without discoloration of the pulp, such as could occur through iron contamination resulting from prolonged beating in cast iron beaters.

The successful and economical production of a bright filler according to the invention and having good retention properties is favorably influenced by (a) precipitating the pigment at a low pH (preferably 3 to 4), (b) avoiding lumps by adding the sodium silicate to a flowing stream of the pulp alum blend at a point of high shear agitation (i.e., a point of high turbulence at which almost instantaneous mixing can be effected) while avoiding penetration of the pulp-alum blend into the sodium silicate supply line at all times, (c) keeping the proportions of ingredients and the concentration of the solutions within determined optimum limits, and maintaining the ratio of pigment to pulp high, and (d) using the right amount of sodium hydroxide to secure maximum yield while preventing the formation of objectionable by-products during precipitation.

The rate at which the sodium silicate may be added to the flowing stream is determined by the intensity of shear agitation of the stream. If the impeller of a centrifugal pump is depended upon for producing shear agitation, the rate of addition of the sodium silicate solution should not exceed fifteen percent of the total flow rate of the pulp-alum stream to which the addition is made. If the pulp-alum blend is subjected to higher shear agitation, as by a blender or homogenizer, the rate of addition may be greatly increased.

It is an important point that the alum is added first to the pulp and that the silicate is thereafter added to the alum-pulp suspension. A low pH (3 to 4) during the precipitation of the pigment is essential to the securement of desirable optical properties in the pigment. If the alum were added to a very alkaline solution, aluminates would be obtained; i.e., compounds of the ion $Al(OH)_4^-$ instead of the desired $Al(OH)_3 \cdot (SiO_2)_2$ compound. By lowering the pH through the further addition of alum, the composition $Al(OH)_3 \cdot (SiO_2)_2$ could be obtained as the final product. In such a case, however, the final product would have a crystalline structure and would not be the same product as if the pigment were precipitated from the acid side. Our theory, not conclusively proved, is that the $Al(OH)_4^-$ ion inhibits the formation of aluminum silicate, causing the product to be a mere mixture of aluminum hydroxide and silicon dioxide rather than a molecular combination thereof.

A very serious difficulty encountered in working out a practical and dependable procedure has involved the avoidance of the formation of lumps of aluminum silicate. Such lumps, if allowed to form, produce objectionable spots in the finished paper known as "fish eyes." It has been found that the lumps occur if:

(1) The alum solution can penetrate back into the silicate supply line at start-up or shut-down;

(2) The rate of silicate addition is higher than warranted by the degree of shear agitation maintained at the point of addition; or (3) The two solutions are allowed to contact one another under conditions of no agitation or poor agitation. The contact of the solutions should be caused to occur at a point of high shear agitation preferably at least as great as that found within a standard centrifugal pump.

As described, the pulp and alum are circulated by means of a standard centrifugal pump and the sodium silicate is desirably added to the flowing stream at a rate limited by the degree of shear agitation and desirably not more than about 15% of the total stream flow, care being taken to prevent penetration of the alum mixture into the silicate supply line, and to introduce the silicate at a point of high shear agitation, preferably at or near the eye of the impeller of the circulating pump.

Filler of excellent brightness can be obtained from pulp suspensions of various consistencies or with no pulp present. It has been found that the retention of filler at the subsequent paper making is improved to some extent by employing a comparatively thick pulp. For that reason, pulp concentrations of 3 to 4% are advantageous in the manufacture of the filler. The employment of dilute chemical solutions is to be preferred to avoid the formation of large agglomerates of the precipitate. An alum solution of 10% to 11.1% concentration (after addition to the pulp suspension or to an equivalent amount of clear water) is found to be most advantageous. It is desirable that the sodium silicate be provided as about a ten to twenty percent solution and the sodium hydroxide as about a six percent solution when a pulp consistency of 3 to 4 percent is used. At such a pulp consistency, filler retention of 90% plus may be realized in the paper making operation if the white water is re-used.

Pulp-pigment fillers have been made employing ratios of aluminum silicate to total solids which varied from about 3% to about 80%, and the results have been tested by making hand sheets incorporating these fillers. These fillers have been identified by number, the number representing the approximate percentage of ash to total solids in the filler. In filler 70, the fibers are totally embedded in a large excess of pigment. The brightness of this filler is 89.5. In filler 45 all the fibers are covered with pigment but only a small excess of pigment is present. In filler containing 10% ash or less there is no excess of pigment, and the pigment cover on the fibers, if any, is so thin that the filler cannot be distinguished from ordinary pulp under the microscope. In filler 100 no fibers are present, the total solid content consisting of the mineral pigment.

It has been found to be difficult to secure a satisfactory wire retention of filler when filler having a low ash content is used. Regardless of the percent of ash desired in the finished sheet, filler containing substantially more than 45% ash is greatly to be preferred, filler falling within the range of 65% to 100% ash being most satisfactory, if the white water is not recirculated. With white water recirculation filler 45 may be used with satisfactory results.

The optimum yield of pigment for filler 70 can be obtained when the proportions of silicate to alum to caustic are 252 to 350 to 24. It has been found, however, that optimum optical properties can be obtained with 252 to 430 parts silicate, 570 to 345 parts dry alum and 25 to 54 parts sodium hydroxide. The best results for filler 70 can be had within the range of variations indicated by the above figures, but practical and useful results can be had over a considerably wider range. A considerable variation is permissible. In order to keep the pH low during precipitation of the aluminum silicate, the sodium hydroxide should desirably be added with the last quarter of the silicate solution. The range of proportions indicated is recommended for filler 70 for the best combination of yield and optical properties.

All of the fillers from 45 to 100 are bright fillers. Reaction formulations for the various fibrous fillers which have proved most advantageous and which are therefore preferred are given below, all percentages being on a dry basis and based on the quantity of fibers provided:

| Filler | Alum, percent | Silicate, percent | Sodium Hydroxide, percent |
|---|---|---|---|
| 80 | 605 | 432 | 54.8 |
| 70 | 354 | 252 | 32 |
| 65 | 283 | 201 | 25.6 |
| 45 | 124 | 88.5 | 11.2 |

The function of sodium hydroxide in the formulation is to supply sufficient $(\overline{OH})$ ions for the formation of hydrated aluminum silicate according to the requirements of Equation d above.

During the reaction, the pH increases from three to four. The pH behavior during the precipitation depends on how much sodium hydroxide is used in the formulation and also the stage of the process at which it is added. The following methods of addition have been tried:

(a) The NaOH was dissolved in and added with the last quarter of the silicate;

(b) The NaOH was dissolved in and added with the last half of the silicate;

(c) The NaOH was dissolved in and added with all the silicate; and (d) A 10% solution of NaOH was added after the silicate addition was completed.

Table 1 shows the results of this study.

Table I

Method a

| Run No. | Percent alum | Percent sodium silicate | Percent NaOH | Basis weight | Ash from filler | Total ash | B. & L.[1] opacity | LRL brightness | B. & L.[1] opacity | Filler No. |
|---|---|---|---|---|---|---|---|---|---|---|
| 1246 | 354 | 252 | 29.5 | 28.1 | 4.5 | 10.0 | 73.7 | 74.7 | 73.8 | 1a |
| 1125 | 354 | 252 | 31.5 | 28.4 | 6.3 | 9.8 | 78.5 | 75.6 | 78.0 | 2a |
| 1245 | 354 | 252 | 33.5 | 28.0 | 4.6 | 10.6 | 76.8 | 75.0 | 76.8 | 3a |
| 1247 | 354 | 252 | 37.5 | 28.1 | 4.5 | 10.0 | 75.7 | 74.8 | 75.7 | 4a |

Method b

| Run No. | Percent alum | Percent sodium silicate | Percent NaOH | Basis weight | Ash from filler | Total ash | B. & L.[1] opacity | LRL brightness | B. & L.[1] opacity | Filler No. |
|---|---|---|---|---|---|---|---|---|---|---|
| 1249 | 354 | 252 | 29.5 | 28.1 | 4.3 | 10.1 | 76.2 | 74.9 | 76.2 | 1b |
| 1248 | 354 | 252 | 33.5 | 27.7 | 3.7 | 9.5 | 74.1 | 74.0 | 74.4 | 2b |
| 1251 | 354 | 252 | 37.5 | 28.5 | 4.6 | 10.2 | 76.4 | 72.0 | 75.8 | 3b |

Method c

| Run No. | Percent alum | Percent sodium silicate | Percent NaOH | Basis weight | Ash from filler | Total ash | B. & L.[1] opacity | LRL brightness | B. & L.[1] opacity | Filler No. |
|---|---|---|---|---|---|---|---|---|---|---|
| 1121 | 354 | 257 | 17.7 | 27.6 | 3.4 | 9.5 | 74.8 | 74.1 | 75.2 | 1c |
| 1122 | 354 | 257 | 23.6 | 27.6 | 2.9 | 10.1 | 75.0 | 73.8 | 75.4 | 2c |
| 1125 | 354 | 257 | 27.5 | 28.1 | 3.8 | 10.7 | 76.8 | 74.9 | 76.8 | 3c |
| 1252 | 354 | 257 | 29.5 | 28.0 | 4.0 | 9.8 | 77.2 | 68.7 | 77.2 | 4c |
| 1253 | 354 | 257 | 33.5 | 28.5 | 3.5 | 9.5 | 76.4 | 72.2 | 75.2 | 5c |
| 1254 | 354 | 257 | 37.5 | 29.2 | 3.2 | 9.3 | 75.7 | 73.2 | 74.7 | 6c |

Standard formulation

| Run No. | Percent alum | Percent sodium silicate | Percent NaOH | Basis weight | Ash from filler | Total ash | B. & L.[1] opacity | LRL brightness | B. & L.[1] opacity | Filler No. |
|---|---|---|---|---|---|---|---|---|---|---|
| 1262 | 496 | 252 | 26.0 | 27.8 | 4.5 | 9.3 | 75.7 | 75.3 | 75.8 | |
| 1244 | | Clay | | 28.6 | | 10.3 | 74.4 | 71.4 | 73.8 | |
| 1123 | | Clay | | 28.2 | | 10.4 | 72.1 | 71.7 | 72.3 | |

Method d

| Run No. | Percent alum | Percent sodium silicate | Percent NaOH | Basis weight | Ash from filler | Total ash | B. & L.[1] opacity | LRL brightness | B. & L.[1] opacity | Filler No. |
|---|---|---|---|---|---|---|---|---|---|---|
| 1130 | 354 | 252 | 23.6 | 28.1 | 4.0 | 10.1 | 76.5 | 72.2 | 76.5 | 1d |
| 1131 | 354 | 252 | 27.5 | 27.4 | 4.1 | 10.0 | 76.9 | 71.1 | 77.2 | 2d |
| 1132 | 354 | 252 | 31.5 | 27.6 | 4.5 | 10.6 | 77.9 | 70.5 | 78.1 | 3d |
| 1135 | 354 | 252 | 35.4 | 28.1 | 5.1 | 10.3 | 76.6 | 71.3 | 76.6 | 4d |
| 1134 | 354 | 252 | 29.5 | 28.4 | 5.3 | 10.1 | 76.8 | 70.4 | 76.6 | 5d |
| 1133 | | Clay | | 28.3 | | 10.0 | 75.1 | 67.9 | 75.0 | |

[1] B. & L. corrected to 28 pounds basis weight.

The results of these tests have been carefully compared and analyzed, and the conclusion has been reached that method (a) has a definite advantage. The general conclusion has been reached that a formulation of 354% alum, 252% sodium silicate and 32% sodium hydroxide, using method (a) for preparing the filler, will produce the best optical properties in the sheet with the maximum yield of filler. A comparatively small quantity of caustic is desirably added after the precipitation is completed to adjust the pH to the range of 4.3 to 4.5, and the resulting filler is then delivered to the regulating box of the paper making machine, the feeding of furnish pulp, clay, the filler of this invention, and other materials being adjusted to secure prescribed properties of the finished paper.

The pigment-fiber filler illustratively described has been referred to as made from a blend of hardwood and pine paper making fibers in the ratio of 70% hardwood fibers to 30% pine fibers. The fiber proportions can be varied to any extent desired, even to the point of using one hundred percent hardwood or one hundred percent pine. In fact, any kind of paper making fibers or any blend of fibers can be used in making the filler, and the filler can be added to any paper which it is desired to brighten and/or opacify, including light weight publication papers.

EXAMPLE 2

The preparation of the filler was the same as in Example 1 except that two changes were made.

(1) Pulp at a consistency of 3.9% was used as the starting material, and (2) In order to keep the pH of the paper making furnish up to the normal operating range of 4.5 to 4.8, one hundred pounds of caustic, sodium hydroxide (or the equivalent of other alkaline material such as $Ca(OH)_2$ or $Na_2CO_3$), in fifty gallons of water was added to the filler after the precipitation was completed. The proportions of silicate, alum and sodium hydroxide to the oven dry pulp used were 252%, 329% and 31.3%, respectively. The percentage of caustic finally added for raising the pH amounted to 7.8% of the oven dry pulp used. The resulting filler had a pH of 3.9 to 4 before addition of the caustic, because of the buffering action brought about by the $Na_2SO_4$ and HOH system. It had a density of 1.16, and included 73.3% ash on an oven dry basis. This filler was used in a number of paper making runs with the following results:

Specifications on fifty pound government book of 73 G. E. brightness and 90 printing opacity are met by substituting 3% of the novel filler for 2.5% Titanox C-50. The produced paper had a 77 G. E. brightness, two and one-half points higher than the 74.5 G. E. brightness of the regular grade. The printing opacity dropped from 92 to 91. The material cost reduction was $6.50 per ton of paper.

The G. E. brightness of 40.6 pound blank book white was increased two to three points, from 78.5 to 82 at a cost per ton of $5.25. The Nelson opacity increased from 72 to 73. The specifications on this paper are G. E. brightness 77, Nelson opacity 69.

The specifications of G. E. brightness 77, Nelson opacity 82 are met on 60 pound poster paper with a substitution of 3% of the novel filler for 2.5% Titanox C-50. The paper produced had a G. E. brightness of 82—two to three points higher than the G. E. brightness of 79 of the regular grade. The Nelson opacity remained at 82.

The addition of the filler of Example 1 to regular furnish caused a severe drop in pH from 4.8 to about 4.0. The size test dropped with the pH of the furnish. The pH of the furnish could be brought to normal by adding caustic to the filler, as in Example 2, after the pigment is precipitated, and by cutting down on the normal addition of alum to the furnish at the beater of the paper making machine.

*Example 3*

Figure 2:
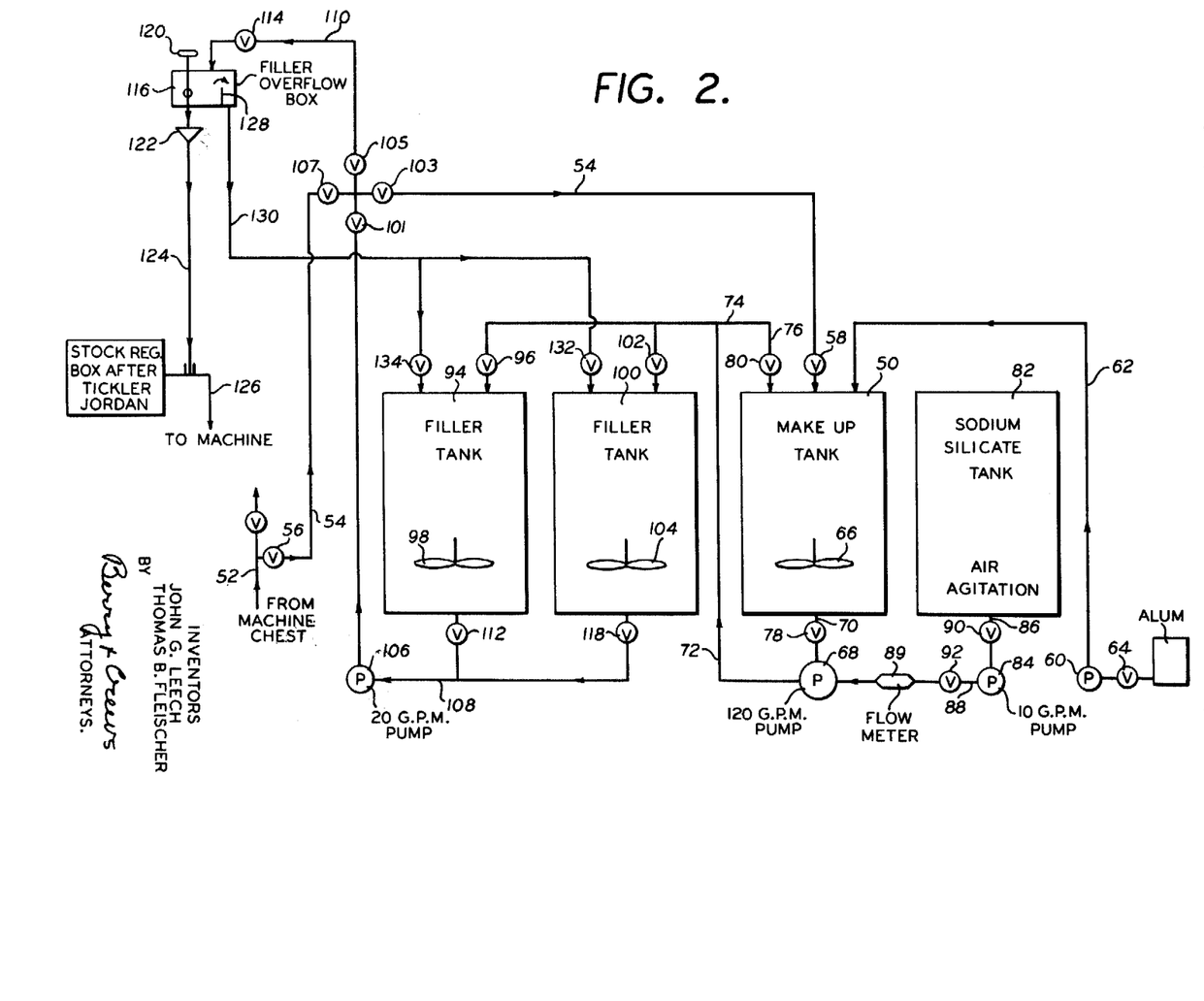
FIGURE 2 is a diagrammatic view of a different form of apparatus suitable for use in a batch process.

A further example was carried out with equipment of the kind diagrammatically illustrated in FIGURE 2. The tanks illustrated in FIGURE 2 were all of stainless steel. The pigment-fiber filler was made up in one thousand gallon batches. For each one thousand gallon batch the following raw materials were used:

| Materials: | | Percent [1] |
|---|---|---|
| Pulp, 550 gals at 4.2% consistency, 192.5 lbs. O.D. | | 100 |
| Alum solution, 120 gals containing 700 lbs. dry alum | | 364 |
| Silicate, 317 gals at 15.4% concentration, 480 lbs. dry silicate | | 249 |
| Sodium hydroxide, 10 gals at 50%, 63.4 lbs. dry NaOH | | 32.9 |
| Sodium hydroxide, 2.3 gals at 50% for pH adjustment, 14.5 lbs. dry NaOH | | 7.6 |

[1] Percent based on O.D. pulp.

The makeup tank 50 was filled from the chest of an associated paper making machine with a 4.2% consistency pulp to the 550 gallon level, the pulp being furnished through conduits 52 and 54 under the control of manually operated valves 56 and 58. 120 gallons of alum solution containing 700 pounds of dry alum were then pumped into the makeup tank 50 by a pump 60 disposed in a conduit 62, under the control of a manually operated valve 64, and were mixed with the pulp by a stirrer 66.

One hundred ten gallons of sodium silicate solution were delivered into a silicate tank 82 and the tank was filled with water to the 317 gallon level, thereby reducing the concentration of the solution to 15.4%. The pulp and alum mixture was then recirculated by a 120 gallon per minute pump 68 through conduits 70, 72, 74 and 76 under the control of manually operated valves 78 and 80. The 15.4% sodium silicate solution was fed from the silicate tank 82 to the impeller of the pump 68 by a pump 84 through conduits 86 and 88 and a flow meter 89 under the control of manually operated valves 78 and 80. The 15.4% sodium silicate solution was fed from the silicate tank 82 to the impeller of the pump 68 by a pump 84 through conduits 86 and 88 and a flow meter 89 under the control of manually operated valves 90 and 92 at a rate of six gallons per minute. When three-quarters of the silicate solution had been delivered, ten gallons of 50% sodium hydroxide solution were delivered to the tank 82 and then mixed through air agitation with the remaining sodium silicate. The mixture of sodium hydroxide and sodium silicate was then added to the recirculating pulp.

After precipitation, the pH of the resulting filler suspension was adjusted to 4.4 by the addition of 2.3 gallons of a sodium hydroxide solution containing 14.5 pounds of sodium hydroxide.

Two batches were made up and delivered to storage tanks 94 and 100 through conduits 72 and 74 under the control of manually operable valves 96 and 102. A third batch was then made up in the make-up tank 50 and then the three batches were mixed together, by pumping from the make-up tank 50 to the two storage tanks 94 and 100 and at the same time pumping from the latter two tanks back to the make-up tank 50. The latter pumping was effected by the pump 106 through portions of conduits 110 and 54, the valves 105 and 107 being closed and the valve 103 being open at that time. The same procedure was followed on the next day.

Filler delivered to the overflow box 116 was discharged through an adjustable slot valve 120 into a funnel 122, and delivered thence through a pipe 124 to a point in the feed line 126 of a paper making machine located after the tickler jordan. The slot valve 120 was set to discharge the filler to the funnel at a slower rate than that at which the filler was received by the overflow box 116. The surplus filler suspension flowed over a dam 128 and was returned by gravity through a line 130 to the tank from which it came, either 94 or 100, the destination being controlled by the selective operation of valves 132 and 134.

Strictly comparable paper machine runs were made, using the novel pigment-pulp filler for making 14.65 tons of paper on the one hand and using titanium dioxide filler for making 49 tons of paper on the other, the paper produced being a fifty pound government offset book paper that requires the use of a high efficiency filler in the furnish to meet the specified brightness and opacity requirements. Every set of paper produced on the paper making machine during the trial runs was subjected to paper property testing by two laboratories working independently. Both laboratories arrived at the same conclusions concerning the similarities and differences of the papers.

Based on the findings of this investigation, paper made with the novel pigment-pulp filler has higher brightness, equal opacity, somewhat higher bulk, equal wet web strength, slightly lower pick (1), lower burst (four pounds), slightly weaker sheets in general, better over-all retention, and considerably reduced cost, as compared with the sheet made with the use of titanium dioxide as filler. In spite of the weaker sheet, the runability on the paper machine of the sheet embodying the novel pigment-pulp filler did not seem to be adversely affected. As a matter of fact, the down time due to web breaks on the machine was 6.3% with the novel pigment-pulp filler as compared to 8.4% with titanium dioxide filler.

The costs of titanium dioxide filler and the novel pigment-pulp filler per ton of paper were calculated to be $25.20 and $11.80 respectively, giving a saving of $13.40 per ton of paper in favor of the novel pigment-pulp filler.

Figure 3:
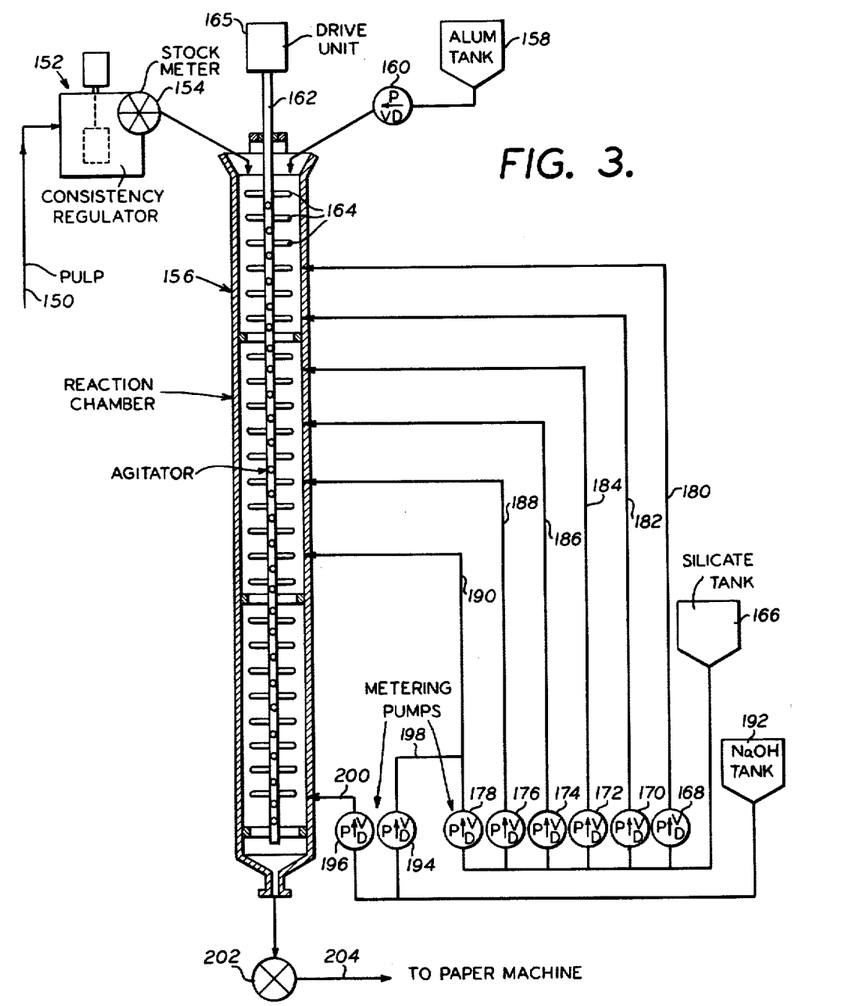
FIGURE 3 is a diagrammatic view of apparatus suitable for use in a continuous process.

The production of the novel pigment-pulp filler is not limited to the batch process described in the foregoing examples. In FIGURE 3 apparatus is diagrammatically illustrated which may be used in producing the filler by a continuous process. In this process the proportioning of materials is controlled by selecting desired relative rates of flow of the several ingredients rather than by measurements of batches of the ingredients. For illustrative purposes the formulation will be assumed to be the same as that of Example 3.

In accordance with the procedure pursued in connection with the FIGURE 3 apparatus, pulp, preferably refined pulp, having a consistency of 4.2% or more is fed through a line 150 to a stock consistency regulator 152, by which the consistency is automatically adjusted to 4.2%. The pulp of this consistency is delivered at a selected, predetermined rate by a stock meter 154 to one end of a blender, illustratively a vertical column 156, which is of circular cross section.

The stock meter 154 and all the metering pumps of FIGURE 3 hereinafter referred to are driven from a common, variable speed shaft (not shown) for controlling throughput. The stock meter 154 and each of the other metering pumps has an individual rate adjusting means for varying the ratios as desired. Flow meters, not shown, may be associated with each of the pumps for guiding the regulation of the individual pumps.

An alum solution containing approximately 5.83 lbs. of dry alum per gallon is fed from an alum tank 158 by a metering pump 160 to the upper end of the column 156. A vertical drive shaft 162 extends axially downward within the column 156 for substantially the full length of the column, and is equipped with novel impeller blades 164. The shaft 162 is driven rapidly by the motor 165. The blades 164 are formed to drive the suspension within the column horizontally. They serve to mix the alum solution and the pulp suspension with one another and with other solutions which are added at intervals along the column. They also serve to maintain the suspension in a state of high shear agitation.

Silicate solution containing approximately 1.51 pounds of dry sodium silicate per gallon is fed from a silicate supply tank 166 by a group of metering pumps 168, 170, 172, 174, 176 and 178 which are arranged in parallel relation, and which deliver the silicate solution through conduits 180, 182, 184, 186, 188 and 190, respectively, to the column 156 at successively lower levels along the column. Each of the conduits referred to is desirably provided with a check valve (not shown) at the point of delivery to the column 156, to preclude all possibility of the pulp-alum suspension penetrating the silicate system at any time. Every one of the conduits 180–190 delivers the silicate solution to the column 156 at a point of high shear agitation, and since the silicate delivered is divided illustratively between six separate conduits delivering at six separate points, the rate of silicate addition at any one of these points may be low as compared with the velocity at which the pulp-alum suspension travels past that point.

A sodium hydroxide solution containing approximately 6.34 lbs. of dry sodium hydroxide per gallon is fed from a sodium hydroxide supply tank 192 by metering pumps 194 and 196. Sodium hydroxide from metering pump, 194 is delivered by conduit 198 directly into silicate conduit 190 immediately after metering pump 178. The mixture of sodium hydroxide and sodium silicate is then delivered to column 156 at a point of high shear agitation. This corresponds to the sodium hydroxide added with the last quarter of the sodium silicate in Example 3. The sodium hydroxide delivered through the conduit 200 goes directly into column 156 and may correspond to the sodium hydroxide added for adjusting the pH to 4.4.

The resulting pulp-pigment filler suspension is withdrawn from the lower end of the column 156 by a metering pump 202, being delivered by the pump to a paper making machine through a conduit 204.

Assuming that it is desired to duplicate the exact formulation of FIGURE 3, for every 100 gallons of filler delivered by the metering pump 202, the stock meter will be caused to deliver substantially 55 gallons of stock; the metering pump 160 will be caused to deliver approximately 12 gallons of alum solution; the pumps 168–178 will be caused to deliver an aggregate of 31.7 gallons of silicate solution; the pump 194 will be caused to deliver approximately one gallon of sodium hydroxide solution, and the pump 196 will be adjusted to deliver approximately .23 gallon of sodium hydroxide solution.

It will be apparent that with the metering pumps all driven from a common variable speed shaft, the rate of throughput can be raised or lowered merely by increasing or reducing the rotary speed of said shaft, and this is without disturbing the relative proportions of the materials, or the composition of the resulting filler.

The delivery of sodium silicate to the column 156 may be divided equally between pumps 168–176 so that each of the five pumps in the illustrative case will be delivering approximately 4.8 gallons of sodium hydroxide for each 100 gallons of filler delivered to the paper machine by the pump 202. Pump 178 will deliver 7.7 gallons of sodium silicate, which corresponds to approximately one-quarter of the total silicate, to be mixed with one gallon of sodium hydroxide supplied from metering pump 194 through conduit 198 directly into conduit 190. The distribution of load between the sodium silicate pumps may, however, be varied over a considerable range, in which case the sodium hydroxide addition with the silicate need not be limited only to silicate conduit 190.

The successive additions of sodium silicate and sodium hydroxide as the pump-alum suspension progresses from the top toward the bottom of the column 156, causes the downward velocity of the liquid in the column to be progressively increased. For this reason, the conduits 180–190 are disposed to deliver to the column 156 at progressively increased spacings in order that each increment of sodium siilcate may have a substantially uniform time interval for becoming assimilated in, and interacting with, the pulp-alum suspension. The fact that the rate of downward travel is progressively increased does not mean, however, that the pump 168, for example, should deliver the silicate solution at a slower rate than the pump 176. This is true for the reason that the high rotary speed of the liquid induced by the impeller blades 164 chiefly controls the degree of shear agitation maintained at every one of the silicate addition points.

The introduction of the silicate at a series of spaced points means that it is added by comparatively small increments. The rate of addition at each point is small enough to avoid slowing down the rotation of the liquid in the column objectionably, and to permit full recovery of the normal rate of rotation before the next point of introduction is reached.

The continuous process has some very desirable advantages over the batch process. One of these is that the filler is all made up freshly as it is required for use, so that it is not subjected to storage and to possible drying out and solidifying of foam while in storage. Where the continuous process is employed it is only necessary to shut down the filler making apparatus when the requirements for the paper run have been satisfied or substantially satisfied and not to estimate in advance the total requirements with a liberal allowance for error in order to avoid excessive down time for the paper making machine which would result from a deficiency of filler.

The continuous apparatus can be thoroughly flushed out and cleaned whenever its use is interrupted, without any very important loss of material. This may be accomplished by draining the consistency regulator, the alum tank, the silicate tank and the sodium hydroxide tank and supplying water to each of them. With the apparatus in full operation but supplied only with water and the output through the line 204 diverted to a waste line, all residue of the filler making operation may be flushed out in a very short time. The high velocity rotation of the impellers 164 is highly conducive to the rapid cleansing of the column 156.

EXAMPLES 4, 5, AND 6

After the merit of the process employing alum and of the resulting filler had been thoroughly established, experiments were made for determining whether the process could be varied to produce satisfactory fillers by the use of aluminum salts other than alum, and how the product so obtained would compare with the alum produced filler.

Three 46.5 liter batches of filler were made up according to the procedure later described. The material chosen as the source of aluminum ions was varied, and the quantity of such material required for providing equivalent quantities of aluminum ions was accordingly varied. The three batches of filler were similarly used in the making of paper on a laboratory paper machine, and comparison tests of the paper were made.

The batch of Example 4 was a control batch obtained through the use of chemically pure alum, $$Al_2(SO_4)_3 \cdot 18H_2O$$

The ingredients which went into the batch were as follows:

Materials: Percent [1]
1. Pulp, 25.5 l. 70% hardwood, 30% pine pulp suspension having an LRL brightness of 82 units, 900 g. O.D___________________ 100
2. C.P. alum solution, 4.5 l. $Al_2(SO_4)_3 \cdot 18H_2O$, 4211 g. dry__________ 468
3. Silicate solution, 15.37 l. containing 2266 g. dry silicate________________________ 252
4. Sodium hydroxide, 0.63 l. containing 288 g. dry NaOH___________________________ 32
5. Sodium hydroxide, 0.5 l. containing 100 g. dry NaOH___________________________ 11.1

[1] Percent based on O.D. pulp.

The formulations for the batch of Examples 5 and 6 were the same as for Example 4, except that item 2 was varied.

In Example 5, chemically pure aluminum nitrate was used in place of chemically pure alum, so that for Example 5, item 2 of the above table should be changed to read:

| | Percent |
|---|---|
| 2. Chemically pure aluminum nitrate, 4.5 l. $Al(NO_3)_3 \cdot 9H_2O$ (4734 g.) | 526 |

In Example 6, technical grade anhydrous aluminum chloride was used in place of chemically pure alum, so that for Example 6, item 2 of the above table should be changed to read:

| | Percent |
|---|---|
| 2. Aluminum chloride, 4.5 l. $AlCl_3$ (1685 g. $AlCl_3$) | 187 |

Since the above are equivalent quantities of aluminum salts, and in the light of the other examples, it may be said that the ratio of aluminum salt to sodium silicate to sodium hydroxide should be (1) an amount of aluminum salt containing 1000 ionizable, i.e., reactable aluminum atoms to (2) 660 to 835 molecules of sodium silicate to (3) 510 to 705 molecules of sodium hydroxide.

The filler making steps were the same for Examples 4, 5, and 6. In each instance, laboratory equipment of the kind diagrammatically shown in FIGURE 4 was used. A pulp suspension of 4.2% consistency was first beaten to a Williams freeness of 100 and then transferred to a filler tank 300 in the amount of 25.5 liters. The 4.5 liters of chemically pure alum solution (or other aluminum salt) was then added to the pulp suspension in the tank 300 and thoroughly blended by means of a stirrer 302. The prescribed quantity of silicate solution was delivered into the tank 304.

Figure 4:
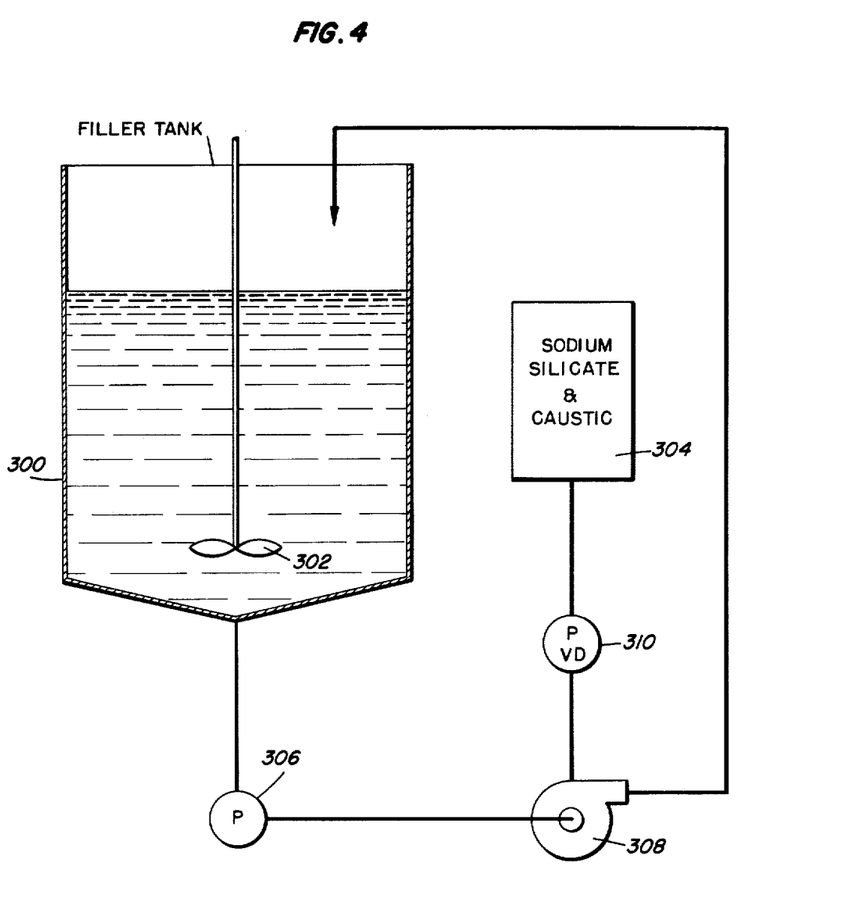
FIGURE 4 is a diagrammatic view of laboratory apparatus used in carrying out several of the examples described herein.

The pulp-aluminum salt blend or partially precipitated material was then pumped at a substantially uniform rate by a pump 306, through a centrifugal pump 308 and delivered back into the tank 300. During this continuous circulation the silicate solution was added to the circulating material at the periphery of centrifugal pump 308, by means of a variable flow pump 310. The operation of the pump 310 was regulated to limit the delivery of silicate solution to a rate not in excess of 5% of the rate of flow of the recirculated material.

When three-quarters of the total silicate solution had been delivered the first addition of sodium hydroxide solution (item 4) was made to the remaining silicate in the tank 304 and blended therewith, the delivery of the material in the tank 304 being continued until exhausted. The second addition of sodium hydroxide (item 5) was then delivered into tank 304, fed out to, and combined with, the recirculating material.

Specimens of the resulting fillers of Examples 4 to 6 were subjected to parallel tests, and portions of the filler samples were used analogously in the making of various paper sheets, the paper being also subjected to a number of identical tests.

| Example | pH | Brookfield viscosity 20 r.p.m., 25° C. | Percent Solids | Percent ash of Solids |
|---|---|---|---|---|
| (4) C.P. alum | 4.1 | 970 | 10.8 | 62.6 |
| (5) C.P. aluminum nitrate | 5.1 | 2,400 | 13.9 | 58.3 |
| (6) Tech. aluminum chloride | 4.5 | 980 | 10.7 | 64.5 |

All viscosities shown are below the "pasty" consistency encountered with mill alum when the silicate addition rate is too high. The higher viscosity of the aluminum nitrate run is probably due to an abnormally high solids content of the particular sample chosen for this test, a disproportionate amount of which was fiber.

Brightness tests of paper sheets showed somewhat erratic results for paper containing two percent ash, but all showed a steady rise of brightness amounting to approximately two points on the LRL brightness scale with increase of the ash content from four percent to ten percent. The brightness data indiacted that there may be a slight brightness advantage for filler prepared from either aluminum nitrate or aluminum chloride. The differences were small, however, and were probably within the limits of experimental error.

The opacity tests of paper sheets similarly indicated consistent increase of opacity with increase of ash content with not much to choose as between the fillers of the several examples. The data indicate minor differences in opacity as a result of different sources of aluminum ions. If one was better than the rest it was the filler made from pure alum, and if one was poorer than the others, it was the filler made from aluminum chloride.

The bulk data indicate that the aluminum sulfate (alum) sample produced higher bulk paper than the others. This is likely to be responsible for the opacity differences where they were seen.

The strength data as shown by burst and tear do not show major differences for various sources of aluminum ions. The highest bulk papers tended to be lowest in burst as might be expected.

In summary, the brightness and opacity differences were within the range of experimental error and tended to follow bulk which went from highest to lowest when the strength went from lowest to highest. The order according to source of aluminum ions was as follows:

| Example | Brightness, opacity, bulk | Strength |
|---|---|---|
| (4) C.P. alum | Highest | Lowest. |
| (5) C.P. aluminum nitrate | | |
| (6) C.P. aluminum chloride | Lowest | Highest. |

It may be generally stated that the brightness, opacity, and bulk imparted by fiber-aluminum-silicate filler goes from best to worst as the source of aluminum ions consists of chemically pure alum, chemically pure aluminum nitrate, and technical aluminum chloride, in that order. Fiber-aluminum-silicate filler of good quality can be made from any of these aluminum sources.

It will be apparent, of course, that the material chosen for blending with the pulp suspension as a source of aluminum ions is in each instance an aqueous solution of an aluminum salt of a strong, common, mineral acid, the solution having a pH of less than 4.

EXAMPLE 7

Example 7 was made up for the purpose of providing and comparing strictly comparable sample sheets containing fillers prepared in the presence and absence of fibers.

For each class of filler the chemicals used were as follows:

| | Grams |
|---|---|
| Mill grade alum | 6,392 |
| Sodium silicate | 4,536 |
| Sodium hydroxide | 576 |

For the filler prepared in the presence of fibers, the starting material was a pulp suspension of three percent consistency containing 1800 grams of oven dry pulp, so that the ratios of alum, silicate and hydroxide based on the fibers present were, respectively, 354%, 252% and 32%. The procedure was that described for Example 2.

For the filler prepared in the absence of fibers, the starting material was clear water corresponding in amount to the aqueous component of the pulp suspension used in making the pigment-pulp filler above. In all other respects the procedures were identical.

Sample sheets of the same paper stock and of the same weight were made up of like ash content, using the fillers prepared in the presence and absence of fibers, and brightness and opacity tests were made.

From 2% to 10% ash content, the brightness of each class of paper increased in proportion to the ash content, the brightness of the paper with the pigment-pulp filler rising steadily from 83.8% to 86.2%, and the brightness of the paper with the filler made in the absence of fibers rising steadily from 85.2% to 87.6%. The latter filler had a consistent advantage of 1.4 points.

From 2% to 10% ash content, the opacity of each class of paper also increased in proportion to the ash content, but with a very slight advantage for the paper employing the pigment-pulp filler. The capacity of this paper rose steadily from 83.4 to 88.2, and the opacity of the paper with filler prepared in the absence of fibers rise steadily from 83.2 to 88. The pigment-pulp filler had a consistent advantage of .2 point.

Various changes may be made in the examples specifically set forth without departing from the spirit of our invention or the scope of the appended claims.

We claim:

1. The method of making a pigment-pulp filler, for use in the manufacture of paper, composed of fibers which are permeated and coated with aluminum silicate, which method comprises blending alum with a pulp suspension, developing a rapidly flowing stream of the alum-pulp blend for the purpose of producing high shear agitation, progressively adding a solution of sodium silicate directly to the blend stream under high shear agitation at a rate sufficiently restricted in relation to the degree of shear agitation maintained to avoid the formation of a lumpy precipitate, and progressively adding sodium hydroxide with a portion at least of the sodium silicate, the quantity of sodium hydroxide added being sufficiently great to assure the substantially complete reaction of the sodium silicate in the production of precipitated aluminum silicate, but sufficiently restricted to avoid raising the pH over four throughout the precipitation process.

2. The method of making a pigment-pulp filler, for use in the manufacture of paper, composed of fibers which are permeated and coated with aluminum silicate, which method comprises providing a quantity of wood pulp suspension of 2 to 4.2% fiber consistency, adding thereto a quantity of paper makers alum which amounts on a dry basis to 124% to 605% of the fibers provided, developing a rapidly flowing stream of the blended alum and pulp, progressively adding to the flowing stream under high shear agitation a 10 to 20% solution of sodium silicate whose total solid content on a dry basis is of the order of 88.5% to 432% of the fibers provided, the sodium silicate solution being added at a rate sufficiently restricted in relation to the degree of shear agitation maintained to avoid the formation of a lumpy precipitate, and adding with the last quarter of the sodium silicate a quantity of dissolved sodium hydroxide whose solid content on a dry basis is of the order of 11.2% to 54.8% of the fibers provided, all while maintaining the fiber suspension at a pH of not more than four.

3. The method of making pigment-pulp filler, for use in the manufacture of paper, composed of fibers which are permeated and coated with aluminum silicate, which method comprises providing a wood-pulp suspension of 3 to 4.2% fiber concentration, adding thereto a quantity of paper makers alum which amounts on a dry basis to 354% of the fibers provided, developing a rapidly flowing stream of the blended alum and pulp, progressively adding to the flowing stream at a point of high shear agitation, a 10 to 13% solution of sodium silicate whose total silicate content on a dry basis is of the order of 252% of the fibers provided, the sodium silicate being added at a rate sufficiently restricted in relation to the degree of shear agitation maintained to avoid the formation of a lumpy precipitate, and adding with a final fraction of the sodium silicate solution a quantity of dissolved sodium hydroxide whose solid content on a dry basis is of the order of 32% of the fibers provided, all while maintaining the fiber suspension at a pH of not more than 4.

4. The continuous process of making pigment-pulp filler for use in the manufacture of paper, composed of fibers which are permeated and coated with aluminum silicate, which method comprises flowing together in predetermined concentrations and relative proportions at the introductory end of a blender, a pulp suspension and an alum solution, causing the pulp suspension and the alum solution to be rotated rapidly throughout a substantial length of travel along the blender to effect a thorough blending of the pulp suspension and the alum solution and to maintain a condition of high shear agitation, introducing a sodium silicates solution into the rotating pulp-alum blend at a succession of points of high shear agitation at an aggregate rate bearing a predetermined relation to the rate of supply of the pulp-alum blend, and adding with a final fraction of the sodium silicate a sodium hydroxide solution to the rotating pulp-alum-silicate combination at a rate suitable to assure the substantially complete reaction of the sodium silicate in the production of precipitated aluminum silicate while avoiding the raising of the pH over four throughout the precipitation process.

5. The method of making, for use in the manufacture of paper, an aluminum silicate filler, which method comprises blending an aluminum salt of a strong, common, mineral acid with water in suitable proportions to form a solution characterized by a pH of less than four, progressively adding a solution of sodium silicate directly to the aluminum salt solution under high shear agitation to form an aluminum silicate precipitate, the sodium silicate being added at a rate sufficiently restricted in relation to the degree of shear agitation maintained to avoid the formation of a lumpy precipitate, and progressively adding sodium hydroxide with a portion at least of the sodium silicate, the total quantity of sodium hydroxide added being sufficiently great to assure the substantially complete reaction of the sodium silicate in the production of the precipitated aluminum silicate but sufficiently restricted to avoid raising the pH over four throughout the precipitation process.

6. The method of making, for use in the manufacture of paper, an aluminum silicate filler, which method comprises blending an aluminum salt of a strong, common, mineral acid with water in suitable proportions to form a solution characterized by a pH of less than four, progressively adding a solution of sodium silicate directly to the aluminum salt solution under high shear agitation to form an aluminum silicate precipitate, the sodium silicate being added at a rate sufficiently restricted in relation to the degree of shear agitation maintained to avoid the formation of a lumpy precipitate, and progressively adding sodium hydroxide with a portion at least of the sodium silicate, the total quantity of sodium hydroxide added being sufficiently great to assure the substantially complete reaction of the sodium silicate in the production of the precipitated aluminum silicate but sufficiently restricted to avoid raising the pH over four throughout the precipitation process, the ratio of aluminum salt to sodium silicate to sodium hydroxide being (1) an amount of aluminum salt containing 1000 ionizable aluminum atoms to (2) 660 to 835 molecules of sodium silicate, to (3) 510 to 705 molecules of sodium hydroxide.

7. The method of making aluminum silicate filler as set forth in claim 6 in which the aluminum salt employed is aluminum sulfate.

8. The method of making aluminum silicate filler as set forth in claim 6 in which the aluminum salt employed is aluminum nitrate.

9. The method of making aluminum silicate filler as set forth in claim 6 in which the aluminum salt employed is aluminum chloride.

10. The method of making aluminum silicate filler as set forth in claim 6 in which the aluminum salt employed is chosen from the group consisting of aluminum sulfate, aluminum nitrate, and aluminum chloride.

11. The method of making, for use in the manufacture of paper, a pigment-pulp filler composed of fibers which are permeated and coated with aluminum silicate, which method comprises providing a quantity of wood pulp suspension of 2 to 4.2% fiber consistency, adding thereto, in aqueous solution, a quantity of an aluminum salt of a strong, common, mineral acid, sufficient to convert the liquid component of the suspension to an aluminum salt solution characterized by a pH of less than four, developing a rapidly flowing stream of the blended aluminum salt and pulp, progressively adding to the flowing stream under high shear agitation a 10 to 20% solution of sodium silicate, the sodium silicate solution being added at a rate sufficiently restricted in relation to the degree of shear agitation maintained to avoid the formation of a lumpy precipitate, and adding with a portion at least of the sodium silicate a quantity of dissolved sodium hydroxide, all while maintaining the fiber suspension at a pH of not more than four, the ratio of aluminum salt to sodium silicate to sodium hydroxide being (1) an amount of aluminum salt containing 1000 ionizable aluminum atoms to (2) 660 to 835 molecules of sodium silicate, to (3) 510 to 705 molecules of sodium hydroxide.

12. The method of making aluminum silicate filler as set forth in claim 6 and supplying the same for use in which a quantity of caustic sufficient to bring the pH up to the range of 4.3 to 4.8 is added to the filler after the precipitation of aluminum silicate is complete.

13. The method of making aluminum silicate filler as set forth in claim 11 in which the wood pulp is beaten after the aluminum salt has been added to it.

14. The method of making pigment-pulp filler as set forth in claim 11 in which the wood pulp is beaten to approximately a 90 seconds Williams freeness before the addition of the aluminum salt solution.

15. The method of making aluminum silicate filler as set forth in claim 6 in which the portion of sodium silicate with which the sodium hydroxide is added is the last quarter of the sodium silicate.

16. The method of making, for use in the manufacture of paper, pigment-pulp filler composed of fibers which are permeated and coated with aluminum silicate, which method comprises providing a wood-pulp suspension of 3 to 4.2% fiber concentration, adding thereto in aqueous solution a quantity of an aluminum salt of a strong, common mineral acid in sufficient quantity to convert the liquid component of the suspension to an aluminum salt solution characterized by a pH of less than 4, developing a rapidly flowing stream of the blended aluminum salt and pulp, progressively adding to the flowing stream at a point of high shear agitation, a 10 to 13% solution of sodium silicate, the sodium silicate being added at a rate sufficiently restricted in relation to the degree of shear agitation maintained to avoid the formation of a lumpy precipitate, and adding with a final fraction of the sodium silicate solution a quantity of dissolved sodium hydroxide, all while maintaining the fiber suspension at a pH of more than 3 but less than 4, the ratio of aluminum salt to sodium silicate to sodium hydroxide being (1) an amount of aluminum salt containing 1000 ionizable aluminum atoms to (2) 660 to 835 molecules of sodium silicate, to (3) 510 to 705 molecules of sodium hydroxide, with the molecular ratio of sodium hydroxide to sodium silicate being no greater than 84.4% and no less than 77.3%.

17. The continuous process of making aluminum silicate filler for use in the manufacture of paper, which comprises flowing together in predetermined proportions components consisting of water and an aqueous solution of predetermined concentration of an aluminum salt of a strong, common, mineral acid, suitable to form a resulting solution characterized by a pH of less than four, causing said components to pass through zones of high shear agitation to effect a thorough blending thereof, introducing a sodium silicate solution into the resulting aluminum salt solution at a succession of points of high shear agitation at an aggregate rate bearing a predetermined relation to the rate of supply of the aluminum salt solution, and adding with a final fraction of the sodium silicate a sodium hydroxide solution to the aluminum salt-silicate combination at a rate suitable to assure the substantially complete reaction of the sodium silicate in the production of precipitated aluminum silicate while avoiding the raising of the pH over four throughout the precipitation process, the ratio of aluminum salt to sodium silicate to sodium hydroxide being (1) an amount of aluminum salt containing 1000 ionizable aluminum atoms to (2) 660 to 835 molecules of sodium silicate, to (3) 510 to 705 molecules of sodium hydroxide.

18. The continuous process of making aluminum silicate filler as set forth in claim 17 which further includes introducing alkali progressively into the flowing filler at a point where the precipitation of the aluminum silicate is complete, and at a rate suitable for raising the pH of the filler to the range of 4.3 to 4.8.

19. The continuous process for making pigment-pulp filler for use in the manufacture of paper, composed of fibers which are permeated and coated with aluminum silicate, which method comprises flowing together in predetermined concentrations and relative proportions components consisting of a pulp suspension and an aqueous solution of an aluminum salt of a strong, common, mineral acid, causing said components to pass through zones of high shear agitation to effect a through blending thereof, introducing a sodium silicate solution into the resulting pulp-aluminum salt blend at a succession of points of high shear agitation at an aggregate rate bearing a predetermined relation to the rate of supply of the pulp-aluminum salt blend, and adding with a final fraction of the sodium silicate a sodium hydroxide solution to the pulp-aluminum salt-silicate combination at a rate suitable to assure the substantially complete reaction of the sodium silicate in the production of precipitated aluminum silicate while avoiding the raising of the pH over four throughout the precipitation process, the ratio of aluminum salt to sodium silicate to sodium hydroxide being (1) an amount of aluminum salt containing 1000 ionizable aluminum atoms to (2) 660 to 835 molecules of sodium silicate, to (3) 510 to 705 molecules of sodium hydroxide.

20. The continuous process of making pulp-aluminum silicate filler as set forth in claim 19 which further includes introducing alkali progressively into the flowing pigment-pulp filler at a point where the precipitation of the aluminum silicate is complete, and at a rate suitable for raising the pH of the filler to the range of 4.3 to 4.8.

21. The method of making, for use in the manufacture of paper, an aluminum silicate filler, which method comprises blending an aluminum salt of a strong, common, mineral acid with water in suitable proportions to form a solution characterized by a pH of less than four, progressively adding a solution of sodium silicate directly to the aluminum salt solution under high shear agitation to form an aluminum silicate precipitate, the sodium silicate being added at a rate sufficiently restricted in relation to the degree of shear agitation maintained to avoid the formation of a lumpy precipitate, and progressively adding sodium hydroxide to the above named materials during the precipitation process, the total quantity of sodium hydroxide added being sufficiently great to assure the substantially complete reaction of the sodium silicate in the production of the precipitated aluminum silicate but sufficiently restricted to avoid raising the pH over four throughout the precipitation process, the ratio of aluminum salt to sodium silicate to sodium hydroxide being (1) an amount of aluminum salt containing 1000 molecules ionizable aluminum atoms to (2) 660 to 835 molecules of sodium silicate, to (3) 510 to 705 molecules of sodium hydroxide.

22. The method of making, for use in the manufacture of paper, a pigment-pulp filler composed of fibers which are permeated and coated with aluminum silicate, which method comprises providing a quantity of wood pulp suspension of 2 to 4.2% fiber consistency, adding thereto, in aqueous solution, a quantity of an aluminum salt of a strong, common, mineral acid, sufficient to convert the liquid component of the suspension to an aluminum salt solution characterized by a pH of more than three but less than four, developing a rapidly flowing stream of the blended aluminum salt and pulp, progressively adding to the flowing stream under high shear agitation a 10 to 20% solution of sodium silicate, the sodium silicate solution being added at a rate sufficiently restricted in relation to the degree of shear agitation maintained to avoid the formation of a lumpy precipitate, and progressively adding a quantity of dissolved sodium hydroxide all while maintaining the fiber suspension at a pH of not more than four, the ratio of aluminum salt to sodium silicate to sodium hydroxide being (1) an amount of aluminum salt containing 1000 molecules ionizable aluminum atoms to (2) 660 to 835 molecules of sodium silicate, to (3) 510 to 705 molecules of sodium hydroxide.

23. The method of making, for use in the manufacture of paper, an aluminum silicate filler, which method comprises blending an aluminum salt of a strong, common, mineral acid with water in suitable proportions to form a solution characterized by a pH of less than four, progressively adding a solution of sodium silicate directly to the aluminum salt solution under high shear agitation to form an aluminum silicate precipitate, the sodium silicate being added at a rate sufficiently restricted in relation to the degree of shear agitation maintained to avoid the formation of a lumpy precipitate, and progressively adding sodium hydroxide to the above named materials during the precipitation process, the total quantity of sodium hydroxide added being sufficiently great to assure the substantially complete reaction of the sodium silicate in the production of the precipitated aluminum silicate but sufficiently restricted to avoid raising the pH over four throughout the precipitation process.

24. The method of making, for use in the manufacture of paper, a pigment-pulp filler composed of fibers which are permeated and coated with aluminum silicate, which method comprises blending an aluminum salt of a strong, common, mineral acid with a pulp suspension, developing a rapidly flowing stream of the blended aluminum salt and pulp, progressively adding a solution of sodium silicate directly to the blend stream under high shear agitation at a rate sufficiently restricted in relation to the degree of shear agitation maintained to avoid the formation of a lumpy precipitate, and progressively adding sodium hydroxide in sufficient quantity to assure the substantially complete reaction of the sodium silicate in the production of precipitated aluminum silicate, all while avoiding raising the pH over four throughout the precipitation process.

25. An aluminum silicate filler, for use in the manufacture of paper, obtained by the method defined in claim 23.

26. A pigment-pulp filler, for use in the manufacture of paper, composed of fibers which are permeated and coated with aluminum silicate, said pigment-pulp filler having been made by the method defined in claim 24.

References Cited in the file of this patent

UNITED STATES PATENTS

| 1,808,067 | Rafton | June 2, 1931 |
| 2,340,728 | Baker et al. | Feb. 1, 1944 |
| 2,599,093 | Craig | June 3, 1952 |
| 2,705,198 | Seybold | Mar. 29, 1955 |
| 2,757,085 | Pacquin | July 31, 1956 |
| 2,786,758 | Taylor | Mar. 26, 1957 |
| 2,949,379 | Boland | Aug. 16, 1960 |

OTHER REFERENCES

Casey, "Pulp and Paper," volume I, Interscience Publishers, Inc., New York, 1952 (pp. 406, 407, 468–489 and 716–719).

UNITED STATES PATENT OFFICE

CERTIFICATE OF CORRECTION

Patent No. 3,099,570 July 30, 1963

John G. Leech et al.

It is hereby certified that error appears in the above numbered patent requiring correction and that the said Letters Patent should read as corrected below.

Column 11, line 70, for "pump-alum" read -- pulp-alum --; column 14, line 4, for "indiacted" read -- indicated --; column 15, line 11, for "capacity" read -- opacity --; line 14, for "rise" read -- rose --; column 16, line 14, for "silicates" read -- silicate --; column 17, line 31, for "aluminum silicate" read -- pigment-pulp --.

Signed and sealed this 14th day of January 1964.

(SEAL)
Attest:

ERNEST W. SWIDER
Attesting Officer

EDWIN L. REYNOLDS
Acting Commissioner of Patents